United States Patent [19]
Aikawa et al.

[11] Patent Number: 5,844,730
[45] Date of Patent: Dec. 1, 1998

[54] LIGHT-SUPPLYING OPTICAL DEVICE

[75] Inventors: Toshiya Aikawa, Kawasaki; Nobuhiro Fujinawa; Masayuki Inami, both of Yokohama, all of Japan

[73] Assignee: Nikon Corporation, Tokyo, Japan

[21] Appl. No.: 802,419

[22] Filed: Feb. 18, 1997

Related U.S. Application Data

[63] Continuation of Ser. No. 361,648, Dec. 22, 1994, abandoned, which is a continuation-in-part of Ser. No. 224,577, Apr. 7, 1994, abandoned.

[30] Foreign Application Priority Data

Apr. 7, 1993 [JP] Japan .................................. 5-017326
Apr. 8, 1994 [JP] Japan .................................. 6-095601

[51] Int. Cl.$^6$ .............................. G02B 5/08; G02B 5/10; G02B 7/182; G02B 27/10
[52] U.S. Cl. ..................... 359/851; 359/850; 359/852; 359/853; 359/872; 359/869; 359/626; 359/631; 359/633
[58] Field of Search ....................... 359/851, 850, 359/852, 853, 859, 866, 868, 872, 869, 626, 631, 633

[56] References Cited

U.S. PATENT DOCUMENTS

| 590,798 | 2/1897 | Kohayakawa | 351/221 |
|---|---|---|---|
| 4,989,125 | 1/1991 | Cobb, Jr. et al. | 362/346 |
| 5,191,406 | 3/1993 | Brandestini et al. | 358/22 |
| 5,214,536 | 5/1993 | Prakash | 359/633 |
| 5,222,025 | 6/1993 | Taylor, II | 364/468 |
| 5,255,116 | 10/1993 | Araki et al. | 359/868 |
| 5,285,320 | 2/1994 | Hohberg | 359/868 |

*Primary Examiner*—Davis L. Willis
*Assistant Examiner*—Mohammad Y. Sikder
*Attorney, Agent, or Firm*—Oliff & Berridge, PLC

[57] ABSTRACT

The line bow phenomenon is reduced by appropriately setting the reflective surface and/or the external shape of an optical element (e.g., a toric mirror) thereby realizing approximately linear illumination of the surface of the original document that is being read. In order to do this, optical elements can be formed so that the external shape of the reflective surface of the optical element is bow-shaped. Alternatively, the optical element can be arranged so that the optical axis of the reflective surface is parallel to the axis of the light reflected from the reflective surface.

42 Claims, 13 Drawing Sheets

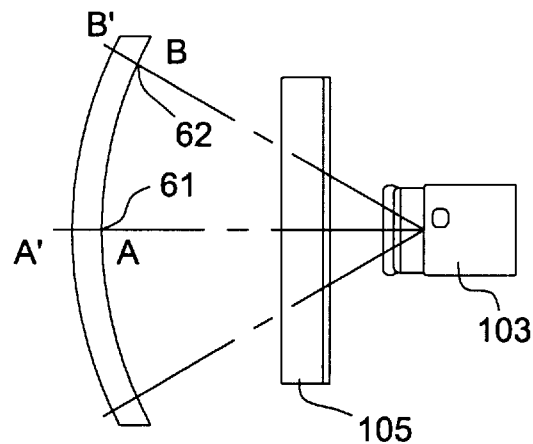
FIG. 6A
PRIOR ART
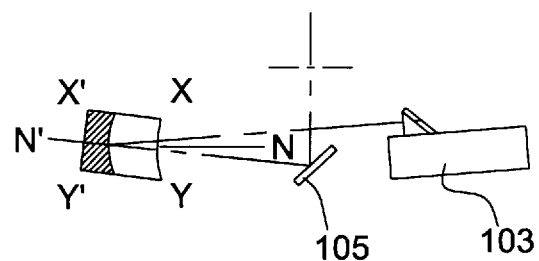
FIG. 6B
PRIOR ART
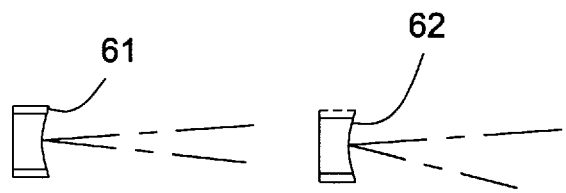
FIG. 6C
PRIOR ART
FIG. 6D
PRIOR ART

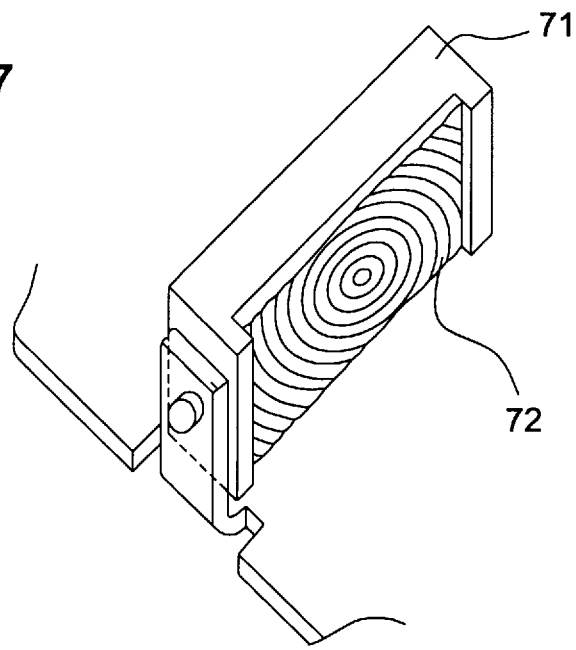
FIG. 7
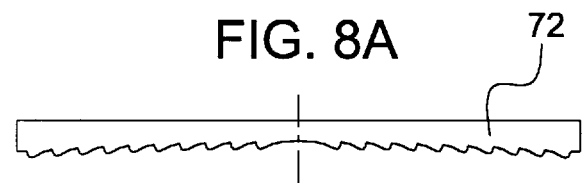
FIG. 8A
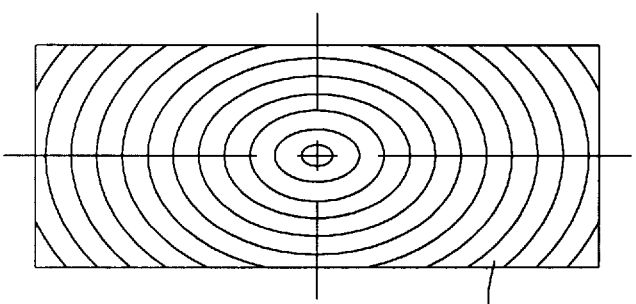 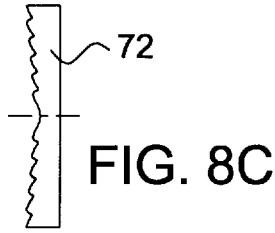
FIG. 8B
FIG. 8C

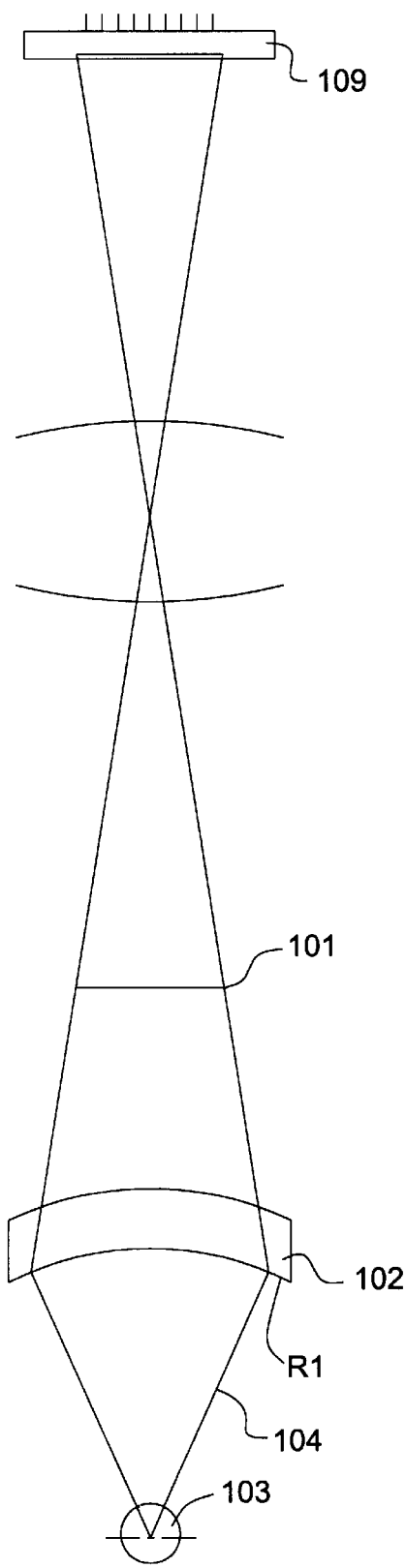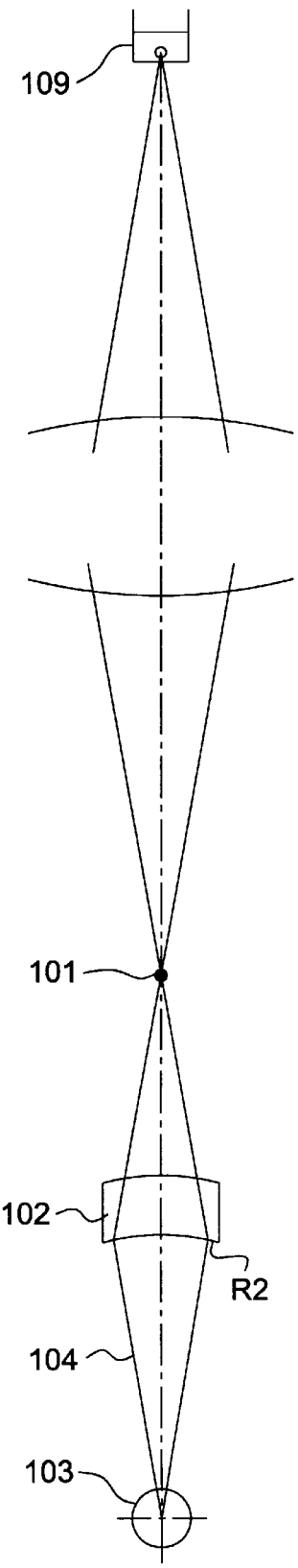
FIG. 17A
PRIOR ART
FIG. 17B
PRIOR ART

FIG. 23
PRIOR ART
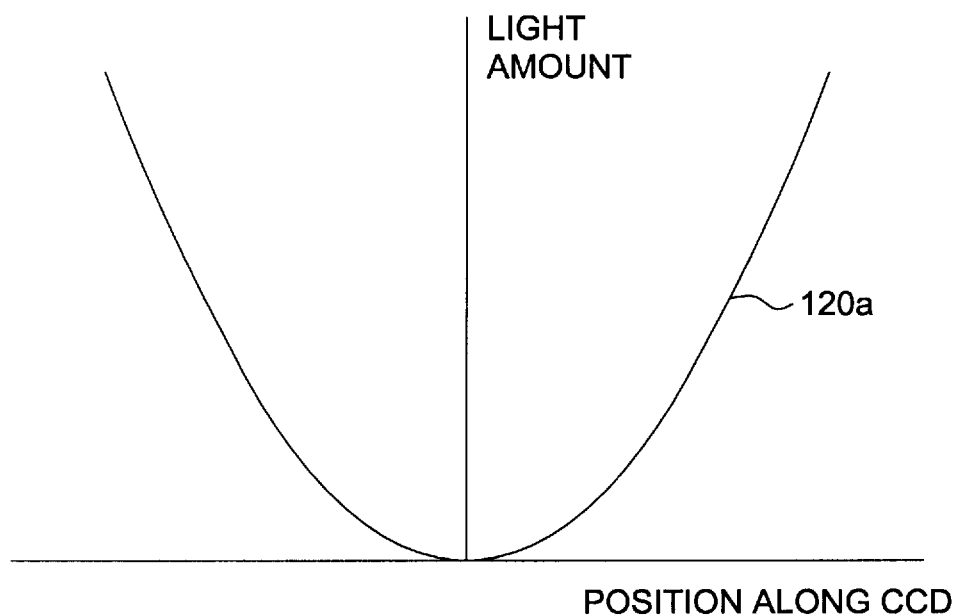
FIG. 24
PRIOR ART 5,844,730

LIGHT-SUPPLYING OPTICAL DEVICE

CROSS REFERENCE TO RELATED APPLICATION

This is a Continuation of application Ser. No. 08/361,648 filed Dec. 22, 1994, now abandoned which in turn is a Continuation-In-Part of application Ser. No. 08/224,577, filed Apr. 7, 1994 now abandoned.

BACKGROUND OF THE INVENTION

1. Field of the Invention

The present invention relates to an image input device that reads image information using photoelectric conversion elements.

2. Description of Related Art

FIG. 15 shows a conventional image input device, the light-supplying optical device of which is shown in FIG. 16. The light-supplying optical device shown in FIG. 16 has the optical arrangement illustrated in FIGS. 17A and 17B, changing of the direction of the optical path being accomplished through the two mirrors 102 and 105 so that the light-supplying optical device can be housed in a limited space.

In FIG. 16, one of the two mirrors used to change the optical path is a toric mirror 102. As shown in FIGS. 17A and 17B, the toric mirror 102 has a curved surface, which is curved in two perpendicular directions. As shown in FIG. 17A, the toric mirror 102 has a first radius of curvature R1, so that light rays produced by the light source 103 are supplied to a portion of the surface of the original document 101 so as to illuminate a width of one line (e.g., one page width). In addition, as shown in FIG. 17B, a second radius of curvature R2 focuses the light emitted from the light source 103 to be formed into a point on the surface of the original document 101. Accordingly, radii of curvature R1 and R2 together result in the formation of a line of light on the original document, the line having a predetermined length in the R1 direction and a height extending in the R2 direction.

As shown in FIG. 15, light rays produced by the light source 103 are incident on the toric mirror 102. These light rays are incident at angle 111 relative to the axis (the optical axis) 110 of the toric mirror, in order to direct the optical axis of the light rays toward the next optical path changing mirror 105. Light rays reflected by the toric mirror 102 are formed into an image on the surface of the original document 101 via the optical path changing mirror 105. The light rays between the light source 103 and the toric mirror 102 are at an angle 111 relative to the toric mirror optical axis, a downward angle in FIG. 15. Consequently, the light rays between toric mirror 102 and second mirror 105 are also at a downward angle relative to the toric mirror optical axis.

Visible (image) information on the original document illuminated by the light rays is formed into an image on a linear image sensor 109 by a projection lens 108. Image sensor 109 can be, for example, a linear series of charge-coupled-devices (CCDs) that extend in a primary (or fast scan) direction. By moving the holder 107 that holds the original document in the direction indicated by the arrow in FIG. 15 (in what is known as the secondary or slow scan direction), all of the information on the surface of the original document can be read in succession by the linear image sensor 109.

The light source 103 is constructed as shown in FIGS. 18A and 18b. A stem 202 is soldered onto the top of a light source base 201. On this stem 202, a plurality of LED chips are arranged in rows 210a and 210b, and are bonded thereto. Around each LED chip is a conical reflector 202a that reflects the light produced in the sideways direction and projects it upward from the LED chip 201 (see FIG. 18B).

In order to produce light in three colors, the light source 103 is comprised of two LED chip rows 210a and 210b. Blue LEDs that produce a small quantity of light per chip are arranged in one row 210a (e.g., 6 chips). Red LEDs and green LEDs are arranged in a GRGGRG pattern in the other row 210b. After light from the rows 210a and 210b of LED chips is reflected by the reflectors 202a and emitted upward, the light is reflected by a blue-reflecting film 205a or by a wholly reflective mirror 205b that are formed at a certain angle and spacing. The reflected light is emitted towards the front (to the right in FIGS. 18A and 18B, and to the left in FIG. 15), and is collected by the toric mirror 102 so as to extend linearly on the surface of the original document.

The light from the blue LEDs is reflected by the blue-reflecting film 205a, while the light from the red LEDs and green LEDs is reflected by the wholly reflective mirror 205b, so that when viewed from the front of the light source (to the right in FIGS. 18A and 18B, and to the left in FIG. 15), it appears that the three colors of light have all been produced from the same position. Switching between the red, green and blue colors is controlled electronically, making high speed reading of the original document possible.

With the conventional light-supplying optical device described above, because the toric mirror 102 has a radius of curvature R1, and light rays from the light source 103 form an angle 111 with respect to the optical axis 110 of the toric mirror 102, the angle at which the light is reflected by toric mirror 102 differs between the center and the perimeter (i.e., the ends) of the toric mirror 102. As a result, the image of the light source on the surface of the original document 101 is shaped like a bow (i.e., a curved line) as shown by line 120 in FIG. 23, rather than in a straight line as shown by broken line 121.

In addition, the toric mirror 102 also has radius of curvature R2. Because of this bow-shaped image of the light source on the surface of the original document 101, the so-called line bow phenomenon results in the output of the line sensor 109. Consequently, the line on the surface of the original document 101 that is read by the linear image sensor 109 is not uniformly illuminated, creating the problem that the amount of light at the center and at the ends of the line that is read are not uniform. The amount of light shown in FIG. 24 indicates that uniform light quantities cannot be obtained, because the amount of light at the center is smaller, while the amount of light at the ends is greater.

SUMMARY OF THE INVENTION

In this regard, it is an object of the present invention to reduce the line bow phenomenon by appropriately designing the reflective surface and external form of the reflective, optical element (e.g., a toric mirror), so as to realize approximately linear illumination of the surface of the original document that is being read and thereby to obtain uniform illumination.

In order to achieve the above and other objects, and to overcome the shortcomings detailed above, a first aspect of the invention reduces the line bow phenomenon by using an optical element that includes a reflective surface having a bow shape to reflect light from the light source. The bow shape of the optical element is such that the image of the optical element, when viewed from the position of the original document, is straight, rather than bow-shaped. The light from the light source is incident on the reflective surface at a certain angle as in previous devices. However, because the reflective surface is formed having a bow-shaped external form, the reflected light is linear, rather than bow-shaped.

According to a second aspect of the invention, the reflective surface of the optical element is arranged so that light that is incident on the reflective surface at a certain angle is reflected in a direction that is parallel to the optical axis of the reflective surface.

According to a third aspect of the invention, the shape of the reflective surface of the optical element lies on an ellipsoid of revolution formed by reverse projecting a straight image reading line from the focus point (e.g., the line sensor) of an optical system (that focuses light from the original document to the line sensor) through the optical system.

With all aspects of the invention, the reflective surface can be a toric mirror, a cylindrical mirror or a Fresnel mirror, for example.

With the light-supplying optical device having the above structure, the shape of the reflective surface is a shape that cancels the line bow phenomenon. In addition, the external shape of the reflective surface is a curved shape that cancels the line bow phenomenon. By this means, the line bow phenomenon is mitigated when using a reflective surface such as a toric mirror, and it becomes possible for the supply of light on the surface of the original document being read to be approximately linear, and to obtain a supply of light in which the amount of light is uniform.

BRIEF DESCRIPTION OF THE DRAWINGS

The invention will be described in conjunction with the following drawings in which like reference numerals designate like elements and wherein:

FIGS. 6A and 6B are a top view and a side view, respectively, showing an example of a conventional light-supplying optical device;

FIGS. 6C and 6D are side views of the conventional toric mirror showing how light is reflected at the center and at the peripheries, respectively, of the conventional toric mirror;

FIG. 7 is an oblique view of a third embodiment of a light-supplying optical device according to the present invention;

FIGS. 8A–8C are a top view, a front view and a side view, respectively, of the third embodiment of the present invention;

FIGS. 17A and 17B are a top view and a side view, respectively, illustrating a path of supplied light in a conventional light-supplying optical device;

FIG. 23 is an explanatory diagram showing the line bow created in a conventional light-supplying optical device; and FIG. 24 is a graph showing the conventional light quantity distribution detected by a linear CCD receiving the FIG. 23 line bow.

DETAILED DESCRIPTION OF PREFERRED EMBODIMENTS

An explanation of embodiments of the present invention is provided hereafter, with reference to the drawings.

Figure 1A:
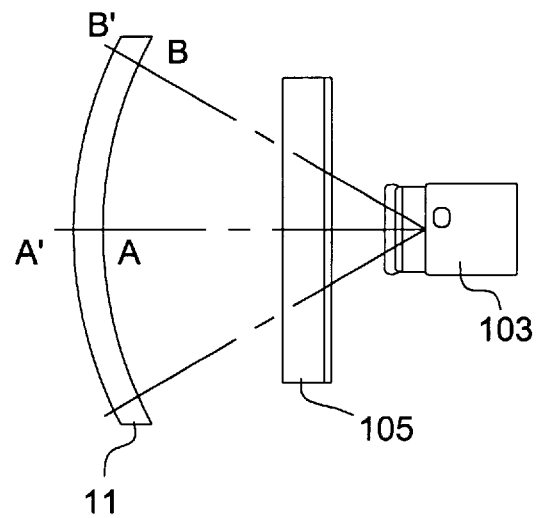
FIGS. 1A and 1B are a top view and a side view, respectively, showing a first embodiment of a light-supplying optical device according to the present invention.
Figure 1B:
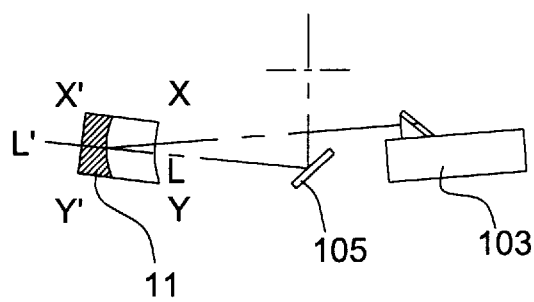

FIGS. 1A and 1B are a top view and a side view showing a first embodiment of a light-supplying optical device according to the present invention.

Figure 13A:
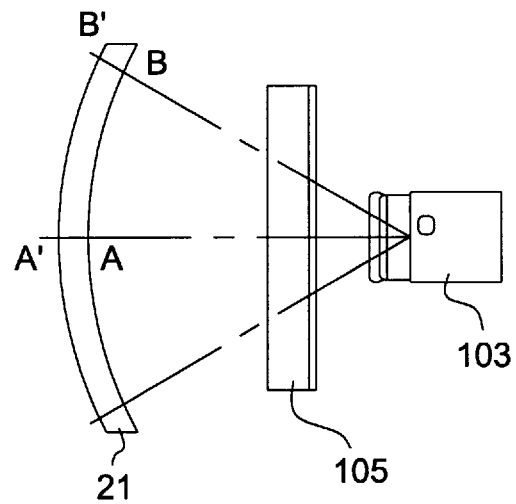
FIGS. 13A and 13B are a top view and a side view showing an example of a conventional light-supplying optical device.
Figure 14:
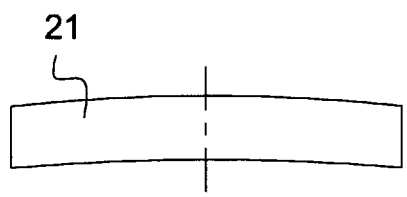
FIG. 14 is a front view of a toric mirror of a conventional light-supplying optical device as viewed from the original document.
Figure 15:
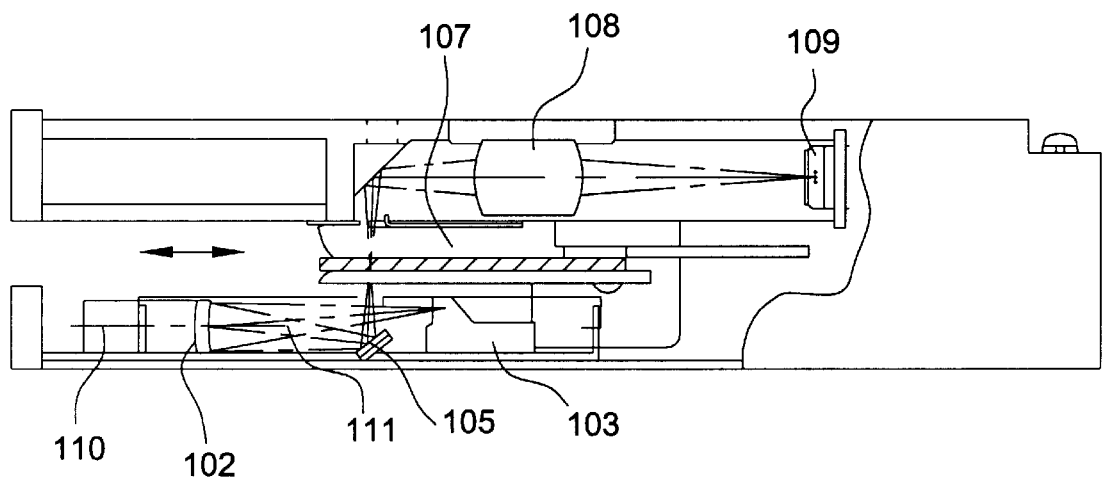
FIG. 15 is a side view showing an example of a conventional image input device.
Figure 16:
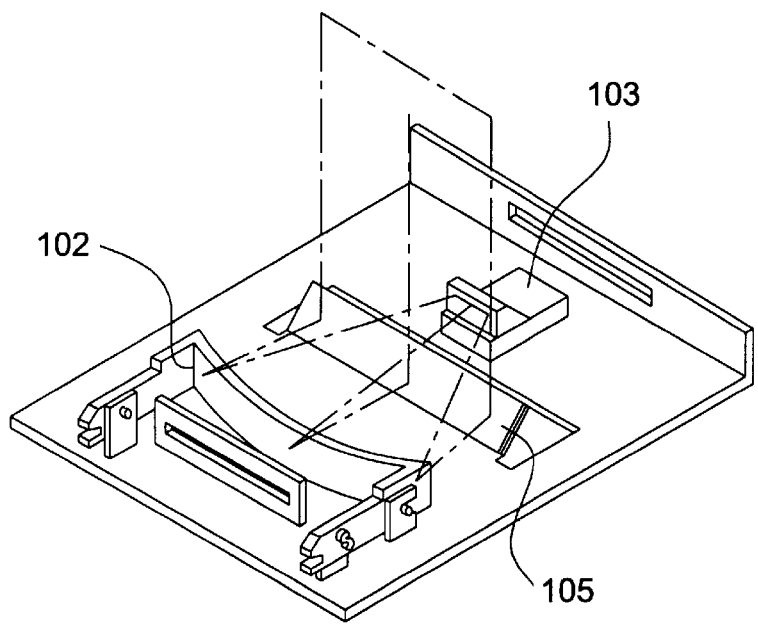
FIG. 16 is an oblique view showing an example of a conventional light-supplying optical device.
Figure 18A:
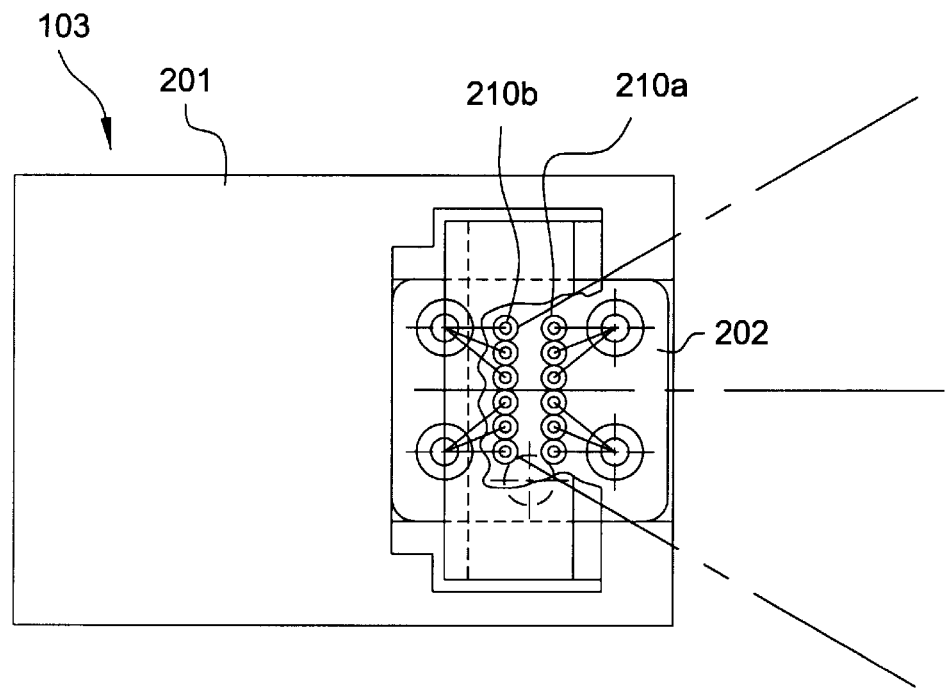
FIGS. 18A and 18B are a top view and a side view of a light source in a conventional light-supplying optical device.
Figure 18B:
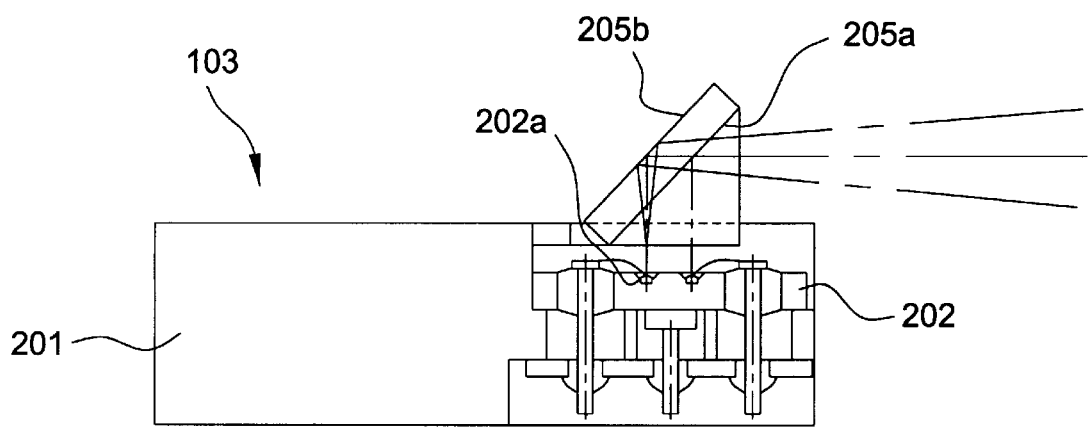

In FIGS. 1A and 1B, the shape and position of the toric mirror 11 are as described below. Conventionally, as shown in FIG. 13A, the shape and position of toric mirror 21 are such that the normal line N–N' at the position of reflection on the optical axis A–A' of toric mirror 21, and the external form lines X–X' and Y–Y' of the toric mirror 21 are parallel, the light reflected from the toric mirror 21 being at an angle to lines N–N', X–X', and Y–Y'. In this case, the external form (i.e., the front view) of the toric mirror 21 has a slightly curved shape, as seen from the surface of original document 101, after reflection by mirror 105, as shown in FIG. 14. In other words, because light is reflected at an angle to the optical axis of toric mirror 21, the image of the toric mirror (and of a line of light reflected by the toric mirror 21) reflected to mirror 105 and then to the original document 101 is curved. This yields the same results as if a curved light source were supplying the light to the original document 101.

Figure 2:
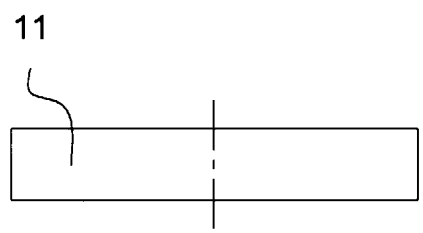
FIG. 2 is a front view of the toric mirror of the first embodiment of the present invention as viewed from the original document.
Figure 13B:
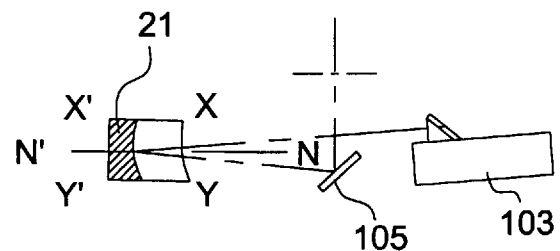

In contrast, in the first embodiment of the present invention, as shown in FIGS. 1A and 1B, the mirror 11 as a whole is inclined more than in the example of FIGS. 13A–13B, so that the direction L–L' of the reflected light is parallel to the optical axis A–A' and to the external form lines X–X' and Y–Y' of the toric mirror 11. Consequently, when viewed from the surface of the original document, the mirror 11 has an approximately linear shape, as shown in FIG. 2. Through this structure, the curvature (line bow) of the illuminating light at the position of the surface of the original document is reduced. Accordingly, non-uniformity of illumination is reduced.

Figure 3:
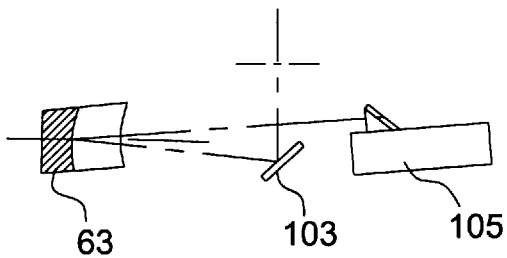
FIG. 3 is a side view showing a second embodiment of a light-supplying optical device according to the present invention.

FIG. 3 is a side view showing a second embodiment of a light-supplying optical device according to the present invention. With the prior art light-supplying optical device (as shown in FIGS. 6A–6D) and in the first embodiment of the invention, the point of reflection of light from the center portion 61 of the reflective surface and from the end portions 62 of the reflective surface of the toric mirror are shifted vertically in relation to each other. This is shown in FIGS. 6C and 6D, which show the points of reflection at the center and at one end, respectively, of the toric mirror. As seen from these figures, the angle of reflection is different at the center and at the ends of the toric mirror because the incident light reflects from different portions of the toric mirror in the vertical (i.e., short) direction of the toric mirror. Accordingly, the center A and the ends B of the toric mirror are not optically identical. In other words, the angle between the incident light and the reflected light at the center A is small as shown in FIG. 6C, while, in contrast, the angle between the incident light and the reflected light at the ends B becomes larger, as shown in FIG. 6D.

Figure 4A:
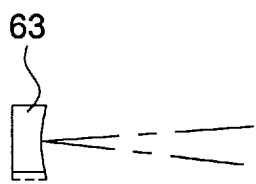
FIGS. 4A and 4B are side views showing the second embodiment of a light-supplying optical device according to the present invention.
Figure 4B:
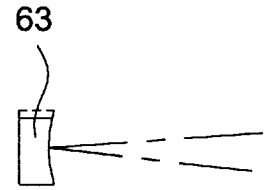
Figure 5:
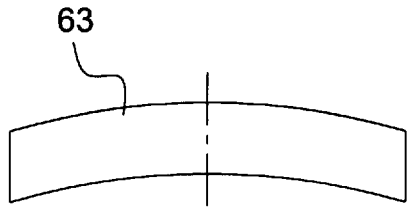
FIG. 5 is a front view of the toric mirror of the second embodiment of the present invention as viewed along the optical axis of the toric mirror.

In the second embodiment of the present invention, the toric mirror 63 is shaped so that the light reflects from the same portion of the toric surface relative to the vertical (short) direction of the toric mirror at the center and at the ends of the toric mirror. In other words, the angle between the incident light and the reflected light at the center A of the toric mirror 63 is the same as the angle between the incident light and the reflected light at the ends B of the toric mirror 63 and, preferably, at all points between A and B, as shown in FIGS. 4A and 4B. In addition, so that the mirror has an approximately linear shape when viewed from the surface of the original document, the external form of the reflective surface of the toric mirror 63 is not linear, but rather is approximately bow-shaped (curved) as shown in FIG. 5. By this means, the curvature (line bow) of the supply of light at the position of the original document surface is reduced without the non-uniformity of illumination increasing, and in addition the non-uniformity of illumination is further decreased because the center and the ends of the toric mirror are optically identical.

Figure 9:
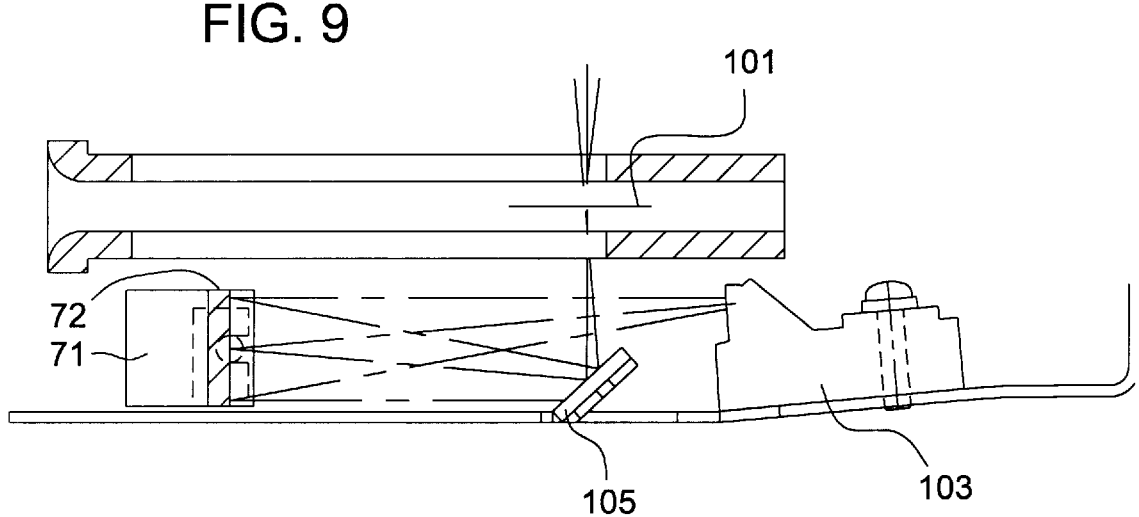
FIG. 9 is a side view of a light-supplying optical device incorporating the third embodiment of the present invention.

FIG. 7 is an oblique view of a third embodiment of a light-supplying optical device according to the present invention. FIGS. 8A–8C are a top view, a front view and a side view of the third embodiment of a light-supplying optical device according to the present invention. In addition, FIG. 9 is a side view showing the third embodiment of the light-supplying optical device according to the present invention. As with the previous embodiments, light emitted by light source 103 is reflected by optical element 71 and mirror 105 to illuminate a portion of an original document 101.

In the third embodiment, the reflective surface of the optical element 71 is not comprised of a toric surface, but rather of an elliptical Fresnel surface 72 having two axes of curvature. FIG. 8A illustrates that the Fresnel surface 72 is curved in the horizontal direction (i.e., the same direction as curvature R1 in FIG. 17A). FIG. 8C illustrates that the Fresnel surface 72 is curved in the vertical direction (i.e., the same direction as the curvature R2 in FIG. 17B). The Fresnel surface 72 is comprised of concentric ellipses. The Fresnel surface 72 having the band pattern of concentric ellipses can be mounted on a flat base plate, forming a compact reflective optical element.

Because the Fresnel surface 72 functions in a manner similar to a toric surface, the positioning and external form of the mirror can be the same as in the first and second embodiments, it being possible to reduce the line bow phenomenon if the arrangement is set so that the mirror has an approximately linear shape when viewed from the direction of the surface of the original document.

Figure 10:
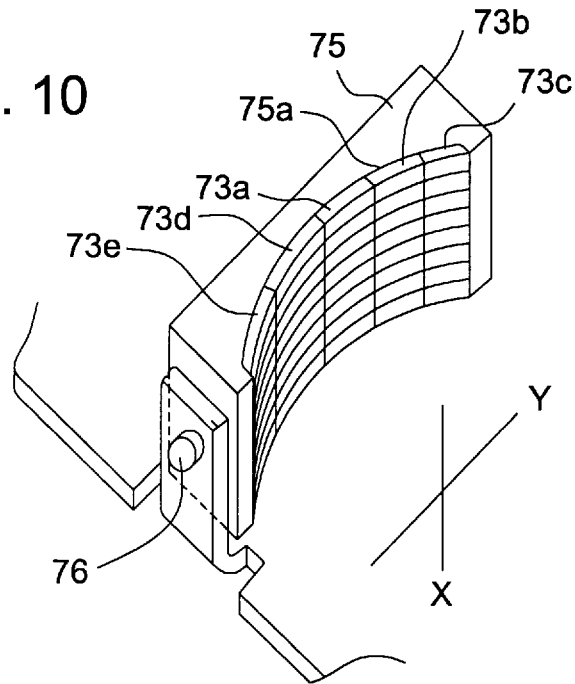
FIG. 10 is an oblique view of a fourth embodiment of a light-supplying optical device according to the present invention.
Figure 11A:
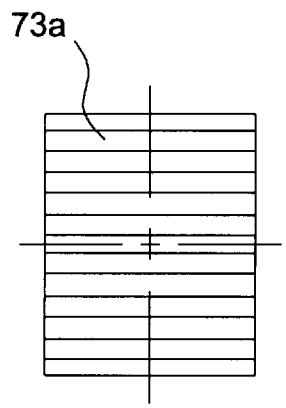
FIGS. 11A–11C are a front view, a bottom view and a side view of the fourth embodiment of the present invention.
Figure 11C:
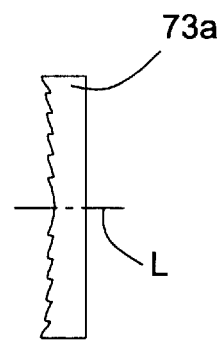
Figure 11B:
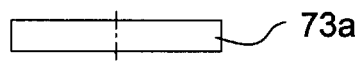
Figure 12:
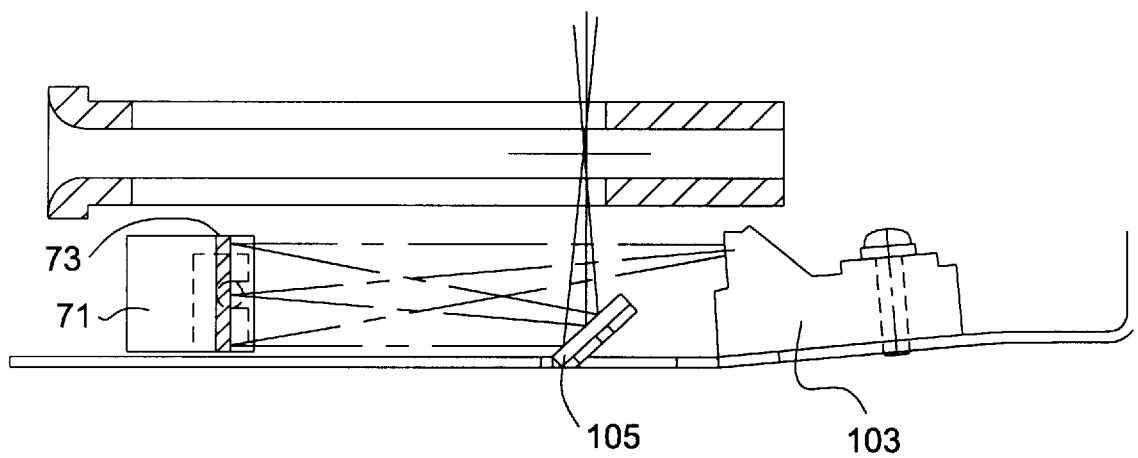
FIG. 12 is a side view of a light-supplying optical device incorporating the fourth embodiment of the present invention.

FIG. 10 is an oblique view showing a fourth embodiment of a light-supplying optical device according to the present invention. FIGS. 11A–11C are a front view, a bottom view and a side view showing the fourth embodiment of a light-supplying optical device according to the present invention. In addition, FIG. 12 is a side view showing the fourth embodiment of the light-supplying optical device according to the present invention.

In the fourth embodiment, a Fresnel mirror is formed from a plurality of component Fresnel mirrors 73a, 73b, 73c, 73d and 73e. A base plate 75 is supported by a support shaft 76 so that the angle of the Fresnel mirror relative to the light rays output from the light source can be adjusted. A curved surface 75a is formed on the surface of the base plate 75 facing the light source. Curved surface 75a has a radius of curvature extending in the same direction as curvature R1 of FIG. 17A, which is parallel to the surface of the original document.

The illustrative Fresnel mirror is comprised of five separate component Fresnel mirrors 73a–73e, which are attached, e.g., adhered or screwed, onto the curved surface 75a of the base plate 75 so as to form a single Fresnel mirror. The component Fresnel mirrors are comprised of rectangular mirror surfaces. In this example, each rectangular mirror surface is flat. As shown in FIG. 10, the component Fresnel mirrors are lined up in the direction of the Y axis (horizontally) on the curved surface 75a. As shown in FIG. 11C, each of the component Fresnel mirrors 73a–73e has a curved surface with a specified radius of curvature extending in the direction of the X axis (i.e., vertically, perpendicular to the surface of the original document).

On the curved surfaces, a uniform Fresnel shaped Fresnel pattern is formed only in the direction of the X axis. That is, a plurality of reflective surfaces are arranged adjacent to each other in the X-axis direction, with each reflective surface being arranged to reflect a ray of light at a slightly different angle than an adjacent reflective surface. This is illustrated in FIG. 11C, which shows that adjacent reflective surfaces are arranged at slightly different angles. As shown in FIG. 11C, the reflective surfaces near the center of each component Fresnel mirror are perpendicular to a center line L extending through the center of the component Fresnel mirror, whereas the reflective surfaces spaced away from the center are arranged at a slight angle to the perpendicular, the slight angle gradually increasing for reflective surfaces located farther from center line L.

Because the curved surfaces are formed only in the direction of the X axis in the component Fresnel mirrors, the radius of curvature of the line bow from the Fresnel mirror formed by the five component Fresnel mirrors 73a–73e is increased. Accordingly, the mirror composed of the five component Fresnel mirrors 73a–73e is capable of forming an image of the light source with diminished generation of the line bow phenomenon, and, therefore, is capable of forming an image of the light source more linearly on the surface of the original document, and on the CCD, thereby realizing a more uniform illumination of the original document. In addition, because the component Fresnel mirrors 73a–73e have a Fresnel pattern only in the direction of the X axis and are flat in the direction of the Y axis, their manufacture is relatively easy. Therefore it is possible to produce the component Fresnel mirrors 73a–73e through the mechanical processing of metal or through the injection molding of plastic.

In order to completely prevent generation of the line bow phenomenon, it would be appropriate to form the component Fresnel mirrors 73a–73e so that the Fresnel shape of each of the component Fresnel mirrors 73a–73e is different. This would compensate for the position of the image of the reflected light rays. In this case, each Fresnel shape would be symmetric with respect to the center line L of the mirror.

The surface in the embodiment described above will be more nearly curved as the number of component Fresnel mirrors used increases. It also would be appropriate to use a single curved surface Fresnel mirror instead of separate component Fresnel mirrors (i.e., each reflective surface in the single component Fresnel mirror would curve in the direction of the Y axis).

Because this structure functions in a manner similar to a toric surface, the positioning and external form of the mirror can be the same as in the first and second embodiments, it being possible to reduce the line bow phenomenon if the arrangement is set so that the mirror has an approximately linear shape when viewed from the direction of the film surface.

In addition, when the Fresnel surface is divided into strips (i.e., components 73a–73e) and the positions of the component Fresnel mirror 73a in the center and the component Fresnel mirrors 73b, 73c, 73d and 73e toward the ends are (vertically) shifted so that they are essentially linear in shape when viewed from the direction of the original document surface, it is possible to make adjustments to create a more linear, more uniform image of the light source. Additionally, it is possible to place the Fresnel mirror without it being inclined, while still reducing the line-bow phenomenon present in conventional devices. The Fresnel surface in the third embodiment shown in FIGS. 7–9 can also be comprised of strips, thereby making it possible to obtain the same results as with the fourth embodiment.

FIGS. 19–22 are an oblique view, a side view, a top view and an oblique view showing a fifth embodiment of a light-supplying optical device according to the present invention.

Figure 19:
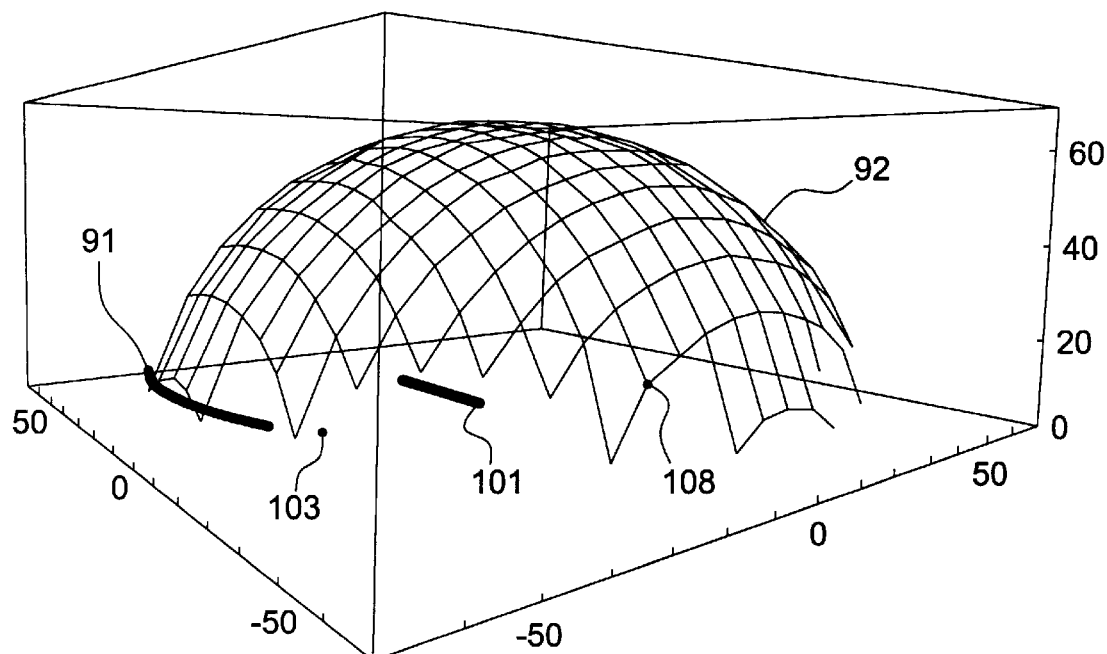
FIG. 19 is an oblique view illustrating a fifth embodiment of a light-supplying optical device according to the present invention.

In FIG. 19, the shape and position of the toric mirror 91 are determined as described hereafter.

The toric mirror 91 is created with the external form of the toric surface having a bow shape (as shown, e.g., in FIG. 5) using part of an ellipsoid of revolution 92. The shape of the ellipsoid of revolution 92 is established as described hereafter.

Figure 20:
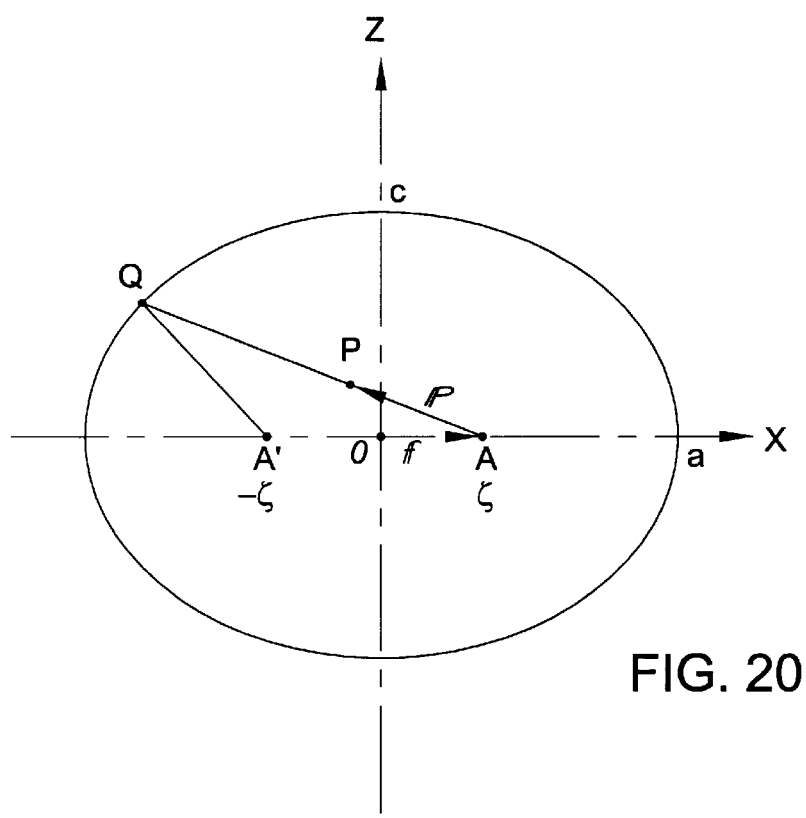
FIG. 20 is a side view illustrating the manner in which the toric mirror of the fifth embodiment of a light-supplying optical device according to the present invention is formed.

As shown in FIG. 20, by positioning the light source 103 at the position of focus A' on the x axis and the entrance pupil of the projection lens 108 at the other position of focus A, because of the properties of the ellipsoid of revolution 92, light rays produced by the light source 103 are concentrated at the entrance pupil of the projection lens 108. In addition, the optical axis center point of the toric mirror 91 is positioned at point Q on the ellipsoid of revolution, the center of one line being read from the surface of the original document 101 being positioned at point P on the line segment QA.

Figure 21:
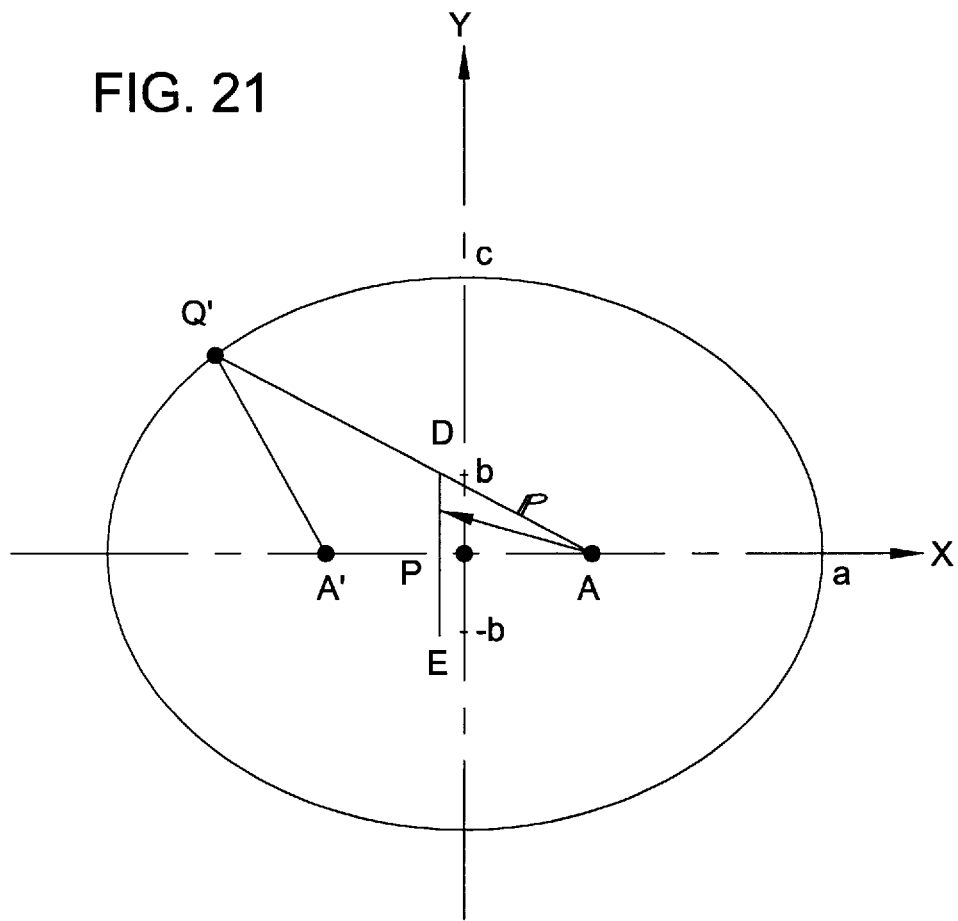
FIG. 21 is a top view illustrating the manner in which the toric mirror of the fifth embodiment of a light-supplying optical device according to the present invention is formed.

Line segment DE, which passes through point P and is parallel to the Y axis, is positioned as shown in FIG. 21. The length of line segment DE corresponds to the length of one line being read from the surface of the original document 101. Referring to the semi-major axis of the ellipse as "a", and the semi-minor axis as "c", the formula for the ellipsoid of revolution is as follows:

$$x^2/a^2 + (y^2+z^2)/c^2 = 1 \tag{1}$$

In addition, from the relationship:

$$\text{segment } AQ + \text{segment } QA' = 2a, \tag{2}$$

we get:

$$c^2 + \xi^2 = a^2 \tag{3}$$

wherein ξ is the distance from the origin to points A and A'.

Next, the bow shape in the external form of the toric surface of the toric mirror 91 is formed as described below.

By tracing back light rays from the position (point A) of the entrance pupil of the imaging lens 108, the path on the ellipsoid of revolution traced by light rays that pass through the (straight) line segment DE becomes the basis for the bow shape in the external form of the toric surface.

Vector f and vector P are defined as shown in FIG. 20.

vector f=(ξ,0,0)

vector P=(α,β,Γ). Here, α and Γ are constants.

In addition, using "k" as a parameter, we get:

vector AQ=k*vector P=k(α,β,Γ)

vector OQ=vector f+k*vector P=(ξ+kα, kβ, kΓ)

$$= (x,y,z) \tag{4}$$

The components of this vector OQ fulfill the conditions of equation (1).

In addition, as shown in FIG. 21, substituting the components of vector OQ into equation (1), within the range −b≤β≤b, we get:

$$(\xi+k\alpha)^2/a^2 + k^2(\beta^2+\Gamma^2)/c^2 = 1, \tag{5}$$

and solving for k, we arrive at:

$$(-\zeta\alpha/a^2 \pm ((\zeta\alpha/a^2)^2 - (\zeta^2/a^2 - 1)(\alpha^2/a^2 + (\beta^2 + \Gamma^2)/c^2))^{1/2}) \div \tag{6}$$

$$(\alpha^2/a^2 + (\beta^2 + \Gamma^2)/c^2) = k$$

and one need only graph the path of vector OQ using parameter k, which has β as a variable.

AP=42.02

PQ=49.20

QA'=40.95

From equation (2), a=66.09

Using the law of cosines, ξ=25.74

From equation (3), c=60.87

In addition, calling QAA'=Θ, the X component α of vector P is:

α=−41.58

Γ=6.03

Substituting these values into equation (6) and finding the path, the result is the toric mirror 91 of FIG. 19. Here, b=12.225, so we have −12.225≤β≤12.225.

In addition, by positioning a slit having the same shape as the illuminated region of the linear surface of the original document 101 so that it is perpendicular to line segment AQ and also includes line segment DE, the path on the ellipsoid of revolution 92 traced by the light rays that pass through the slit after being traced back from point A forms the bow shape of the external form of the toric surface of the toric mirror 91.

Figure 22:
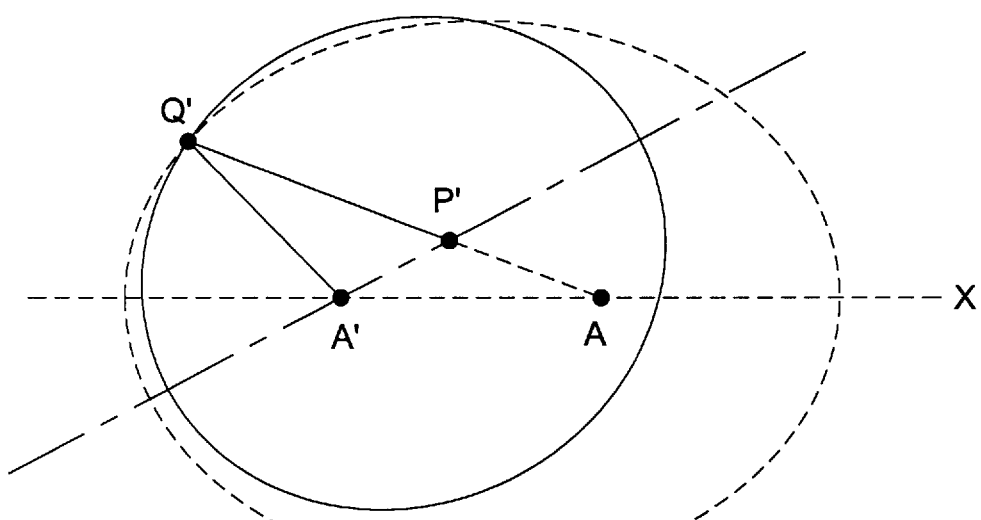
FIG. 22 is an oblique view showing the fifth embodiment of a light-supplying optical device according to the present invention.

It is also possible to divide the bow shape of the external form of the toric surface into strips as in the fourth embodiment. Furthermore, when the shape in the direction of the minor axis, as shown in FIG. 22, is set as described below, the light quantity on the line being read on the surface of the original document 101 is increased. In other words, on a cross section including AQ' A', calling P' the intersection between cross section AQ' A' and line segment DE, by creating the ellipse that passes through point Q' and has A' and P' as foci and creating the part of the ellipse centered at point Q' so that it is formed in the direction of the minor axis, the quantity of light on the line being read on the surface of the original document 101 is increased.

With the embodiments explained above, an explanation was provided for a device with at least one toric mirror having a toric surface with two major meridian, but the advantages of the present invention could be obtained even if the device had a cylindrical mirror and cylindrical lens with a so-called cylindrical surface that is comprised of a toric surface having one major meridian.

With the present invention, as explained above, the line bow phenomenon is reduced by appropriately setting the reflective surface and external shape of the toric mirror. Therefore it is possible to realize approximately linear illumination of the surface of the original document that is being read, thereby obtaining illumination in which the amount of light is uniform.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A light-supplying optical device comprising:
   a light source that emits a supply of light along a first path, said supply of light extending in a primary scanning direction; and
   an optical element located in said first path, said optical element having a reflective surface that reflects and concentrates the supply of light onto an area of an original document, said area extending in the primary scanning direction, said optical element being arranged relative to said first path so that said supply of light is incident on the reflective surface at a non-zero angle relative to an optical axis of the reflective surface, said reflective surface being arranged and shaped so that the reflective surface has an approximately linear shape when viewed from the original document to compensate for a line-bow phenomenon that occurs when light extending in the primary scanning direction and incident on the reflective surface at the non-zero angle is reflected by the reflective surface so that the area of the original document illuminated by said supply of light is a substantially straight line.

2. A light supplying optical device as in claim 1, wherein said reflective surface is bow-shaped when said reflective surface is viewed along said optical axis of said reflective surface.

3. A light supplying optical device as in claim 2, wherein said light source emits light toward said reflective surface from a position located on a first side of a plane that includes said optical axis of said reflective surface, and said reflective surface includes first and second opposite ends that are located on a second side of said plane, opposite from said first side of said plane, by an amount farther than a central portion of said reflective surface, to define said bow-shape.

4. A light supplying optical device as in claim 1, wherein said reflective surface is a toric surface.

5. A light supplying optical device as in claim 4, wherein said toric surface is a toric mirror.

6. A light supplying optical device as in claim 1, wherein said reflective surface contains two major meridians.

7. A light supplying optical device as in claim 1, wherein said reflective surface also extends in said primary scanning direction.

8. A light supplying optical device as in claim 1, wherein said optical element is positioned relative to the light source so that the supply of light is reflected from the reflective surface along a reflection axis that is parallel to said optical axis of the reflective surface.

9. A light supplying optical device as in claim 8, wherein said reflective surface is a toric surface.

10. A light supplying optical device as in claim 9, wherein said toric surface is a toric mirror.

11. A light supplying optical device as in claim 8, wherein said reflective surface contains two major meridians.

12. A light supplying optical device as in claim 1, further comprising:
    a holder that holds the original document illuminated by the supply of light reflected from the reflective surface to form a light image that travels along a second path; and
    an optical system located in said second path, said optical system focussing the light image from the original document into an image at a focus point of the optical system; wherein:
    said reflective surface has a shape, when viewed along the optical axis of said reflective surface, formed by reverse projecting a straight image reading line from the focus point of said optical system through said optical system to an ellipsoid of revolution containing said reflective surface.

13. A light supplying optical device as in claim 12, wherein said reflective surface is bow-shaped when said reflective surface is viewed along said optical axis of said reflective surface.

14. A light supplying optical device as in claim 13, wherein said light source emits light toward said reflective surface from a position located on a first side of a plane that includes said optical axis of said reflective surface, and said reflective surface includes first and second opposite ends that are located on a second side of said plane, opposite from said first side of said plane, by an amount farther than a central portion of said reflective surface, to define said bow-shape.

15. A light supplying optical device as in claim 12, wherein said reflective surface is a toric surface.

16. A light supplying optical device as in claim 15, wherein said toric surface is a toric mirror.

17. A light supplying optical device as in claim 12, further comprising a charge-coupled-device line sensor located at the focus point of said optical system, said straight image reading line being projected from said charge-coupled-device line sensor.

18. A light-supplying optical device as in claim 1, wherein said optical element is a concave Fresnel mirror having: a plurality of reflective surfaces; a first radius of curvature extending in a first direction; and a second radius of curvature extending in a second direction perpendicular to said first direction.

19. A light-supplying optical device as in claim 18, wherein said concave Fresnel mirror comprises multiple component Fresnel mirrors mounted adjacent to each other.

20. A light-supplying optical device as in claim 19, wherein each of said component Fresnel mirrors is curved in said second direction to define said second radius of curvature, each component Fresnel mirror being mounted to an adjacent Fresnel mirror at a slight angle with respect to said first direction to define said first radius of curvature.

21. A light-supplying optical device as in claim 18, wherein said plurality of reflective surfaces of said concave Fresnel mirror are multiple band mirrors arranged in concentric ellipses.

22. A light-supplying optical device comprising:
a light source that emits a supply of light along a first path, said supply of light extending in a primary scanning direction; and
an optical element located in said first path, said optical element having a reflective surface that reflects and concentrates the supply of light onto an area of an original document, said optical element being arranged relative to said first path so that said supply of light is incident on the reflective surface at a non-zero angle relative to an optical axis of the reflective surface, said reflective surface being bow-shaped when said reflective surface is viewed along said optical axis of said reflective surface so that an angle between the incident light and the reflected light at a center of the reflective surface is the same as the angle between the incident light and the reflected light at ends of the reflective surface to compensate for a line-bow phenomenon that occurs when light extending in the primary scanning direction and incident on the reflective surface at the non-zero angle is reflected by the reflective surface.

23. A light supplying optical device as in claim 22, wherein said light source emits light toward said reflective surface from a position located on a first side of a plane that includes said optical axis of said reflective surface, and said reflective surface includes first and second opposite ends that are located on a second side of said plane, opposite from said first side of said plane, by an amount farther than a central portion of said reflective surface, to define said bow-shape.

24. A light supplying optical device as in claim 22, wherein said reflective surface is a toric mirror.

25. A light-supplying optical device as in claim 22, wherein said optical element is a concave Fresnel mirror having: a plurality of reflective surfaces; a first radius of curvature extending in a first direction; and a radius of curvature extending in a second direction perpendicular to said first direction.

26. A light-supplying optical device as in claim 25, wherein said plurality of reflective surfaces of said concave Fresnel mirror are multiple band mirrors arranged in concentric ellipses.

27. A light-supplying optical device as in claim 25, wherein said concave Fresnel mirror comprises multiple component Fresnel mirrors mounted adjacent to each other.

28. A light-supplying optical device as in claim 27, wherein each of said component Fresnel mirrors is curved in said second direction to define said second radius of curvature, each component Fresnel mirror being mounted to an adjacent Fresnel mirror at a slight angle with respect to said first direction to define said first radius of curvature.

29. A light-supplying optical device comprising:
a light source that emits a supply of light along a first path, said supply of light extending in a primary scanning direction; and
an optical element located in said first path, said optical element having a reflective surface that reflects and concentrates the supply of light onto an area of an original document, said optical element being arranged relative to said first path so that said supply of light is incident on the reflective surface at a non-zero angle relative to an optical axis of the reflective surface, said optical element being positioned relative to the light source so that the supply of light is reflected from the reflective surface along a reflection axis that is parallel to said optical axis of the reflective surface so that the reflective surface has an approximately linear shape when viewed from the original document to compensate for a line-bow phenomenon that occurs when light extending in the primary scanning direction and incident on the reflective surface at the non-zero angle is reflected by the reflective surface.

30. A light supplying optical device as in claim 29, wherein said reflective surface is a toric mirror.

31. A light-supplying optical device as in claim 29, wherein said optical element is a concave Fresnel mirror having: a plurality of reflective surfaces; a first radius of curvature extending in a first direction; and a second radius of curvature extending in a second direction perpendicular to said first direction.

32. A light-supplying optical device as in claim 31, wherein said concave Fresnel mirror comprises multiple component Fresnel mirrors mounted adjacent to each other.

33. A light-supplying optical device as in claim 32, wherein each of said component Fresnel mirrors is curved in said second direction to define said second radius of curvature, each component Fresnel mirror being mounted to an adjacent Fresnel mirror at a slight angle with respect to said first direction to define said first radius of curvature.

34. A light-supplying optical device as in claim 31, wherein said plurality of reflective surfaces of said concave Fresnel mirror are multiple band mirrors arranged in concentric ellipses.

35. A light-supplying optical device comprising:
a light source that emits a supply of light along a first path;
an optical element located in said first path, said optical element having a reflective surface that reflects and concentrates the supply of light onto an area of an original document, said optical element being arranged relative to said first path so that said supply of light is incident on the reflective surface at a non-zero angle relative to an optical axis of the reflective surface;
a holder that holds the original document illuminated by the supply of light reflected from the reflective surface to form a light image that travels along a second path; and
an optical system located in said second path, said optical system focussing the light image from the original document into an image at a focus point of the optical system;
said reflective surface having a shape, when viewed along the optical axis of said reflective surface, formed by reverse projecting a straight image reading line from the focus point of said optical system through said optical system to an ellipsoid of revolution containing said reflective surface.

36. A light supplying optical device as in claim 35, wherein said reflective surface is bow-shaped when said reflective surface is viewed along said optical axis of said reflective surface.

37. A light supplying optical device as in claim 23, wherein said reflective surface is a toric mirror.

38. A light supplying optical device as in claim 23, further comprising a charge-coupled-device line sensor located at the focus point of said optical system, said straight image reading line being projected from said charge-coupled-device line sensor.

39. A method of forming a reflective surface of a light-supplying optical device, said light-supplying optical device including a light source that emits a supply of light along a first path, an optical element located in said first path, said optical element having said reflective surface, said reflective surface reflecting and concentrating the supply of light onto an area of an original document, said area extending in a primary scanning direction, said optical element being arranged relative to said first path so that said supply of light is incident on the reflective surface at a non-zero angle relative to an optical axis of the reflective surface, a holder that holds the original document illuminated by the supply of light reflected from the reflective surface to form a light image that travels along a second path, and an optical system located in said second path, said optical system focussing the light image from the original document into an image at a focus point of the optical system, said method comprising:

reverse projecting a straight image reading line from the focus point of said optical system through said optical system to an ellipsoid of revolution; and forming said reflective surface so that said reflective surface is contained in a portion of said ellipsoid of revolution that is intersected by said reverse projected straight image reading line.

40. A method as in claim 39, wherein said reflective surface is formed to have a bow-shape when said reflective surface is viewed along said optical axis of said reflective surface.

41. A method as in claim 39, wherein said reflective surface is a toric mirror.

42. A method as in claim 39, wherein said straight image reading line is projected from a charge-coupled-device line sensor located at the focus point of said optical system.

* * * * *